United States Patent
Cloute et al.

(10) Patent No.: US 11,327,915 B2
(45) Date of Patent: May 10, 2022

(54) DIRECT MEMORY ACCESS

(71) Applicant: STMicroelectronics (Grenoble 2) SAS, Grenoble (FR)

(72) Inventors: Francois Cloute, Coublevie (FR); Christophe Taba, Echirolles (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/830,626

(22) Filed: Mar. 26, 2020

(65) Prior Publication Data

US 2020/0311001 A1    Oct. 1, 2020

(30) Foreign Application Priority Data

Mar. 29, 2019    (FR) ...................................... 1903407

(51) Int. Cl.
*G06F 13/28*    (2006.01)
(52) U.S. Cl.
CPC ................... *G06F 13/28* (2013.01)
(58) Field of Classification Search
CPC ........................................................ G06F 13/28
USPC ................................................... 710/22, 308
See application file for complete search history.

(56) References Cited

U.S. PATENT DOCUMENTS

| | | | | |
|---|---|---|---|---|
| 4,642,759 A * | 2/1987 | Foster | ................... | G06F 3/0601 703/24 |
| 4,953,103 A * | 8/1990 | Suzuki | ................... | G06F 13/30 358/1.14 |
| 5,680,378 A * | 10/1997 | Miyake | ............ | G11B 20/10527 360/69 |
| 6,000,043 A * | 12/1999 | Abramson | .......... | G06F 11/2221 710/110 |
| 6,324,594 B1 * | 11/2001 | Ellis | ........................ | G06F 13/28 710/24 |
| 6,363,438 B1 * | 3/2002 | Williams | ................ | G06F 13/28 709/236 |
| 6,647,511 B1 * | 11/2003 | Swoboda | ............ | G06F 11/3648 714/30 |
| 6,678,755 B1 * | 1/2004 | Peterson | ................ | G06F 13/28 710/22 |
| 6,697,070 B1 * | 2/2004 | Katsura | .................... | G09G 5/26 345/469 |

(Continued)

OTHER PUBLICATIONS

INPI Search Report and Written Opinion for FR 1903407 dated Oct. 9, 2019 (8 pages).

(Continued)

*Primary Examiner* — Faisal M Zaman
(74) *Attorney, Agent, or Firm* — Crowe & Dunlevy

(57) ABSTRACT

A register bank of a channel of a direct memory access circuit is initialized. Transfer cycles are executed as configured by the register bank, and updates are made to the registers from a memory. At each transfer cycle, an operation is performed in accordance with a first field of the register bank to either: carry on the execution or generate a first signal and suspend the execution. In response to each reception of the first signal by a central processing unit, an operation is performed to either: generate a second signal or modify the content of the register band and/or record into the memory a first item representative of a next update of the register bank. A second signal is then generated.

25 Claims, 4 Drawing Sheets

(56) References Cited

U.S. PATENT DOCUMENTS

| | | | | |
|---|---|---|---|---|
| 7,139,848 | B1* | 11/2006 | Murray | G06F 13/28 710/22 |
| 7,904,614 | B1* | 3/2011 | Marshall | G06F 13/28 710/22 |
| 7,954,114 | B2* | 5/2011 | Chamberlain | G06F 9/3879 719/320 |
| 2001/0049755 | A1* | 12/2001 | Kagan | G06F 13/28 710/22 |
| 2002/0038393 | A1* | 3/2002 | Ganapathy | G06F 12/08 710/22 |
| 2005/0021884 | A1* | 1/2005 | Jeddeloh | G06F 13/28 710/22 |
| 2005/0047249 | A1* | 3/2005 | Saga | H04N 1/2112 365/222 |
| 2005/0271126 | A1* | 12/2005 | Chiang | H04B 1/40 375/219 |
| 2006/0253649 | A1* | 11/2006 | Wezelenburg | G06F 9/3879 711/110 |
| 2007/0073922 | A1* | 3/2007 | Go | G06F 13/28 710/22 |
| 2008/0126612 | A1* | 5/2008 | Barrow | G06F 13/28 710/34 |
| 2009/0168525 | A1* | 7/2009 | Olbrich | G06F 3/0604 365/185.11 |
| 2010/0042754 | A1* | 2/2010 | Nishikawa | G06F 13/28 710/22 |
| 2010/0153514 | A1* | 6/2010 | Dabagh | G06F 13/4022 709/213 |
| 2011/0302438 | A1* | 12/2011 | Rosay | G06F 1/3203 713/323 |
| 2012/0287337 | A1* | 11/2012 | Kumar | H04N 5/14 348/425.1 |
| 2013/0283391 | A1* | 10/2013 | Mangalampalli | G06F 21/10 726/26 |
| 2016/0062424 | A1* | 3/2016 | Thomas | G06F 1/24 710/313 |

OTHER PUBLICATIONS

Texas Instruments "TMS320C6474 DSP Enhanced DMA (EDMA3) Controller User's Guide", Oct. 1, 2008 (Oct. 1, 2008), XP055772306.
First Office Action from co-pending EP Appl. No. 20151450.2 dated Feb. 10, 2021 (5 pages).

* cited by examiner

DIRECT MEMORY ACCESS

PRIORITY CLAIM

This application claims the priority benefit of French Application for Patent No. 1903407, filed on Mar. 29, 2019, the content of which is hereby incorporated by reference in its entirety to the maximum extent allowable by law.

TECHNICAL FIELD

The present disclosure generally concerns electronic systems, and more particularly electronic systems implementing data transfers by direct memory access (DMA).

BACKGROUND

Direct memory access is a method generally implemented by a direct memory access circuit allowing, in an electronic system, data transfers between elements (peripheral, memory) of the system without involving a central processing unit (CPU), except to initialize and conclude a succession of transfer cycles. The parameters of the succession of transfer cycles are determined by a linked list of items recorded in a memory of the system. Each item then determines the parameters of one or a plurality of data transfers of a corresponding transfer cycle of this succession of transfer cycles.

There is a need in the art to overcome all or part of the disadvantages of known direct memory access methods.

SUMMARY

In an embodiment, a method is implemented by a system comprising a direct memory access circuit, a central processing unit, and a memory, wherein the method comprises: a) initializing a register bank of a channel of the direct memory access circuit; b) executing transfer cycles over said channel, each of said transfer cycles comprising at least one data transfer configured by a content of the register bank, and an update of the content of the register bank from said memory; c) at each of said cycles, according to at least one first field of the register bank, c1) carrying on the execution of the transfer cycles over said channels or c2) generating a first signal and suspending the execution of the transfer cycles over said channel; d) at each reception of the first signal by the central processing unit, according to a state of the system, d1) generating a second signal, or d2) modifying the content of the register bank and/or recording into the memory a first item representative of a next update of the register bank, and then generating the second signal; and e) at each reception of the second signal by the direct memory access circuit, carrying on the execution of said transfer cycles over said channel.

According to an embodiment, step a) comprises a programming of the register bank by the central processing unit.

According to an embodiment, at step d2), the central processing unit reads a second field of the register bank indicating a first address in the memory at which a second item representative of a next update of the register bank is recorded.

According to an embodiment, at step d2), the central processing unit does not modify the content of the register bank and records the first item at said first address.

According to an embodiment, at step d2), the central processing unit programs the content of the register bank.

According to an embodiment, at step d2), the programming of the content of the register bank is performed based on the first item, without recording the first item into said memory.

According to an embodiment, the direct memory access circuit deactivates said channel at step c2) and activates said channel when it receives the second signal at step d2).

According to an embodiment, at step d2), the second signal is generated by the central processing unit.

According to an embodiment, at step d2), the central processing unit programs another channel of the direct memory access circuit so that said other channel records into said memory said first item and generates the second signal after the recording of said first item into the memory.

According to an embodiment, at step d2), the central processing unit reads a second field of the register bank, said second field indicating a first address in the memory at which a second item representative of a next update of the register bank is recorded.

According to an embodiment, at step d2), the central processing unit programs the second channel so that said first item is recorded at said first address.

According to an embodiment, the first signal is generated by the direct memory access circuit.

According to an embodiment, the first item is the initial item of a linked list of items and, preferably, each item of said list following the initial item is recorded into the memory at step d2).

An embodiment provides an electronic system comprising a memory, a central processing unit, and a direct memory access circuit comprising at least one data transfer channel, the system being configured to implement the above-defined method.

BRIEF DESCRIPTION OF THE DRAWINGS

The foregoing and other features and advantages will be discussed in detail in the following non-limiting description of specific embodiments in connection with the accompanying drawings wherein.

DETAILED DESCRIPTION

Figure 1:
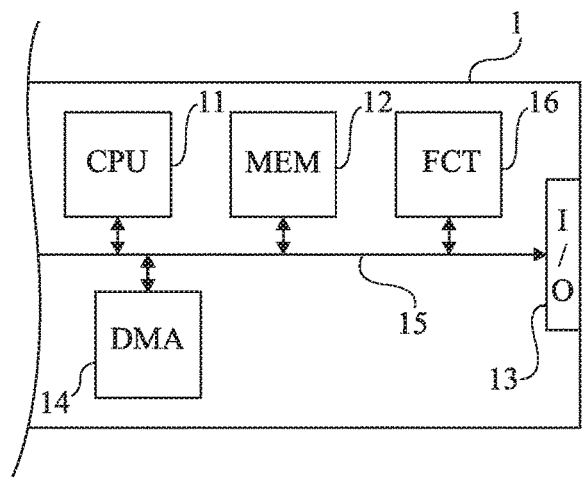
FIG. 1 schematically shows in the form of blocks an embodiment of an electronic system of the type to which the described embodiments apply as an example.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the details of implementation of a data transfer via a data transfer channel of a direct memory access circuit, particularly regarding the management of requests of access to a bus or to a memory and the acknowledgements of such requests have not been described, the described embodiments being compatible with usual direct memory access data transfers. Further, the various parameters currently used to define one or a plurality of data transfers performed during a cycle of data transfer over a channel of a direct memory access circuit have not been detailed, the described embodiments being compatible with such usual parameters. Further, the various electronic systems where a direct memory access circuit is provided have not been detailed, the described embodiments being compatible with such usual electronic systems.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 very schematically shows, in the form of blocks, an embodiment of an electronic circuit or system 1 of the type to which the embodiments which will be described apply as an example.

Electronic system 1 comprises: a central processing unit 11 (CPU), for example, a state machine, a microprocessor, a programmable logic circuit, etc.; one or a plurality of memories, among which at least one RAM 12 (MEM), for example, of SRAM type; at least one input/output interface 13 (I/O) of communication, for example, of serial bus type, with the outside of system 1; a direct memory access circuit 14 (DMA); and one or a plurality of data, address, and/or control buses between the different elements internal to system 1, here shown in the form of a single bus 15.

Further, system 1 may integrate other functions, symbolized by a block 16 (FCT), according to the application, for example, a processor dedicated to image processing, other interfaces, other memories, etc.

System 1 is configured to execute various applications such as image processing, encoding, and/or video decoding, processing of data originating from a sensor, etc. Such applications require data transfers, via bus 15, between elements internal to system 1. To fluidize the operation of system 1 and decrease the load of central processing unit 11, such data transfers are performed by direct memory access, via circuit 14.

In this embodiment, circuit 14 comprises a plurality of data transfer channels and, for each channel, a channel configuration register bank. Each channel of circuit 14 enables to carry out cycles of data transfer between two elements (circuit and/or memory) of system 1. Each cycle comprises one or a plurality of data transfers having their parameters determined by the current content of the configuration register bank, and an update of the register bank to obtain the parameters of the data transfer(s) of the next cycle. During the last transfer cycle, the update of the configuration register bank may be omitted. Further, the data transfer of a transfer cycle may correspond to a null transfer where no data are transferred.

When an application has to be executed by system 1, central processing unit 11 allocates a channel of circuit 14 to the application. For this purpose, central processing unit 11 programs or initializes the bank of registers of configuration of a free channel of circuit 14, that is, a channel which not already allocated to an application, so that circuit 14 reserves the channel for the application. Once central processing unit 11 has programmed the channel configuration register bank, a plurality of data transfer cycles of the application are successively carried out over the channel.

Figure 2:
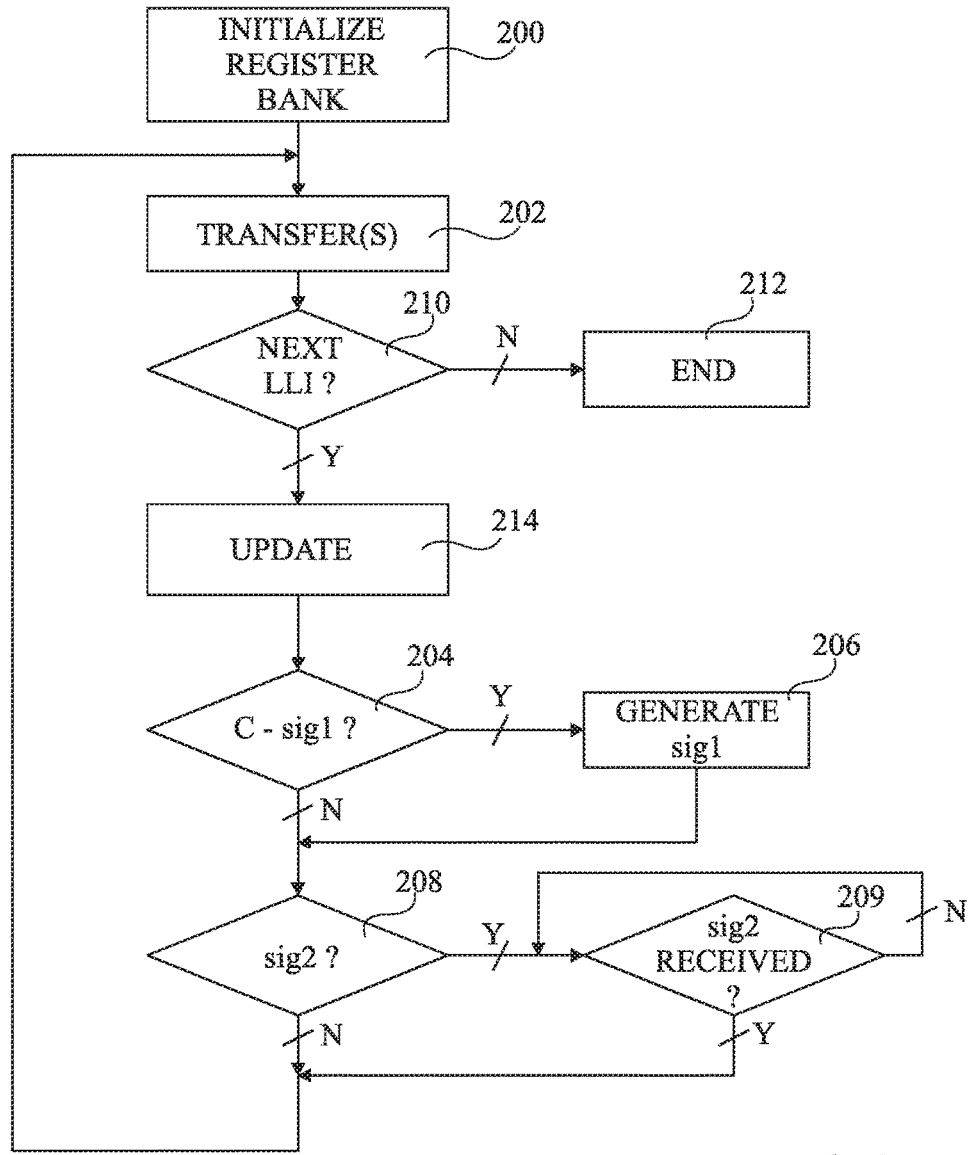
FIG. 2 is a timing diagram illustrating an embodiment of a method of transfer by direct memory access.

FIG. 2 is a flowchart illustrating, in the form of blocks, an embodiment of a method of data transfer by direct memory access, for example, implemented by system 1 of FIG. 1.

At an initial step 200 (block "INITIALIZE REGISTER BANK"), a channel of circuit 14 is assigned to an application by programming the configuration register bank associated with the channel. The programming is performed by central processing unit 11.

More particularly, at step 200, a first field C-@ of the register bank is programmed with information representative of an address in a memory of system 1, preferably an address in memory 12 of system 1. This address corresponds to the memory address having the first item of a linked list of items, that is, the initial item of the list, recorded into it. The other items in the list are also recorded into the memory. The linked list defines a corresponding succession of transfer cycles of the application. In practice, a linked list of items is a linked list of data structures. In the described embodiments, each item of a linked list of items is representative of an update of the channel configuration register bank. Each item of a linked list of items determines the memory address of the next item in the list. Further, each item of a linked list of items determines the parameters of the data transfer(s) of a transfer cycle corresponding to this item.

Further, at step 200, central processing unit 11 programs a second field C-sig1 of the register bank associated with the channel. The function of field C-sig1 will be described in relation with a next step of the method.

Further, at step 200, third fields C-param of the register bank are programmed by central processing unit 11. The fields C-param are representative of the parameters of the data transfer(s) of the next data transfer cycle implemented over the channel. As an example, the parameters of the data transfer(s) of a transfer cycle comprise an indication that the data transfer(s) concern data or data blocks, an indication of the start address of an address range of a source where the data or the data blocks to be transferred are stored, an indication of the start address of an address range of a destination where the transferred data or data blocks should be copied, an indication of the number of data or of data blocks to be transferred, an indication of the size of the data, an indication of the number of data per blocks, an indication of an address offset between two successive data or between two successive blocks to be transferred, etc. Thus, each item of a linked list of items, and thus each transfer cycle implemented over a channel, may thus correspond to the transfer of one or a plurality of data or of one or a plurality of data blocks between a source and a destination.

Preferably, the programming of the register bank by central processing unit 11 can only be performed when the corresponding channel is in a deactivated state or, in other words, in a non-allocated state. The allocated or non-allocation state of a channel is determined by circuit 14.

The register bank associated with the channel may comprise other fields than those described hereabove.

At the end of initialization step 200, central processing unit 11 provides an activation signal to circuit 14. When circuit 14 receives the activation signal, it places the channel in an active state or, in other words, in an allocated state.

The method carries on at a next step 202 (block "TRANSFER(S)") marking, for example, the beginning of a transfer cycle. At step 202, circuit 14, performs, over the allocated channel, the data transfer(s) parameterized by the current content of the register bank of the channel, in particular by fields C-param of the register bank.

At a next step 210 (block "NEXT LLI?"), circuit 14 determines based on the content of the register bank whether the current transfer cycle is the last transfer cycle of the application. As an example, when field C-@ of the register bank is at a zero value, for example, when the bit(s) forming field C-@ are all at logic '0', this means that the current transfer cycle is the last one of the application.

In the case where the current transfer cycle is the last one of the application (output N of block 210), at a next step 212 (block "END"), circuit 14 frees or deactivates the channel and generates a signal for the central processing unit indicating thereto that the channel is free. The method is then over. The method may be implemented again by allocating, at a new step 200, the channel to an application.

In the case where the application comprises next transfer cycles (output Y of block 210), for example, when field C-@ is at a non-zero value indicating the memory address of an item corresponding to an update of the register bank, at a next step 214 (block "UPDATE"), the register bank is updated based on this item.

At a next step 204 (block "C-sig1?"), circuit 14 reads field C-sig1 of the register bank, that is, the current content of field C-sig1. Field C-sig1 stores content whose state is representative of an indication of whether circuit 14 should or should not generate a signal sig1. As an example, field C-sig1 and/or one or a plurality of other fields of the register bank further indicate which signal sig1 should be generated and/or at what time of the current transfer cycle signal sig1 should be generated.

If field Csig1 indicates that no signal sig1 should be generated (output N of block 204), the method carries on at a next step 208 (block "sig2?").

If field C-sig1 indicates that a signal sig1 should be generated (output Y of block 204), the method carries on at a next step 206 (block "GENERATE sig1"). At step 206, circuit 14 generates signal sig1. After step 206, the method carries on at step 208.

At step 208, circuit 14 verifies, for example, based on the content of the register bank read at step 204, whether a signal sig2 should be received by circuit 14 before carrying on the execution of the transfer cycles over the channel.

If no signal sig2 is to be received before carrying on the execution of the transfer cycles (output N of block 208), the method carries on at step 202, for example marking the beginning of a new transfer cycle. At step 202, circuit 14 performs, over the allocated channel, the data transfer(s) parameterized by the current content of the register bank of the channel, for example, updated from an item of a linked list of items during the last step 214.

If a signal sig2 is to be received before carrying on the execution of the transfer cycles over the channel, the method carries on at a step 209 (block "sig2 RECEIVED?"). At step 209, circuit 14 verifies whether it receives signal sig2. As long as signal sig2 has not been received (output N of block 209), step 209 is repeated. When signal sig2 has been received (output Y of block 209), the method carries on at step 202.

The provision of signals sig1 and sig2 enables suspension, over a channel, of the execution of the transfer cycles of an application until the reception of signal sig2 by circuit 14.

It is here provided that at least for certain transfer cycles, signal sig1 is generated for central processing unit 11 and that, after having received signal sig1, central processing unit 11 modifies or not, according to the state of system 1, the next transfer cycles provided over the channel. The central processing unit then generates or triggers the generation of signal sig2 so that the execution of the transfer cycles carries on over the channel. As an example, central processing unit 11 determines the state of system 1 by means of the content of one or a plurality of state registers and/or the reception of one or a plurality of interrupt signals originating from various elements of the system and/or from peripherals connected to system 1.

More particularly, when the central processing unit receives signal sig1 and determines that the next transfer cycles over the channel should be modified, central processing unit 11 modifies the content of the configuration register bank and/or records into the memory an item representative of a next update of the register bank. Such a modification of the content of the register bank and/or the address at which the item is recorded are such that one or a plurality of transfer cycles different from those provided will then be implemented over the channel.

Preferably, when central processing unit 11 records an item representative of an update of the register bank and/or modifies all or part of the content of the register bank so that one or a plurality of next transfer cycles different from the provided transfer cycles are implemented, a plurality of items corresponding to a plurality of successive updates of the register bank are recorded into the memory. These items are then recorded in the form of a linked list of items corresponding to the future transfer cycles of the application to be implemented over the channel.

The method of FIG. 2 thus enables, by means of the synchronization signals formed by signals sig1 generated and sig2 received by circuit 14, on execution of a same application, not to execute the future transfer cycles initially provided, and to replace them with other future transfer cycles. Thus, on execution of a same application, at least two possible futures or branches may be provided as concerns the execution of the data transfers of the application. The selection of one or the other of these futures is performed by central processing unit 11, during step 209, according to the state of system 1. The possibility of providing a plurality of possible executions as concerns the transfer cycles of an application and of choosing between the possible executions according to the state of system 1 enables to adapt the execution of the application to the state of the system.

Although this is not detailed herein, preferably, each possible execution of an application is known in advance and is, for example, determined or defined in a boot program of system 1, the boot program being, for example, the first program executed by the system when system 1 is powered on or reset.

According to implementation modes, signal sig1 is the same for all the transfer cycles where a signal sig1 is generated, and signal sig1 is then generated for central processing unit 11. In this case, each time signal sig1 is generated, a same signal sig2 should be supplied by central processing unit 11 and received by circuit 14 before carrying on the execution of the transfer cycles. In these embodiments, the reading of field C-sig1 by circuit 14 thus enables to determine whether step 209 should or should not be implemented, and also which signal sig2 is expected at this step. In such embodiments, step 208 may be carried out simultaneously to step 204, step 209 being then implemented directly after step 206.

According to other implementation modes, the register bank comprises a field C-sig2 indicating whether a signal sig2 should or should not be received during the current transfer cycle before carrying on the execution of the transfer cycles over the channel. In this case, field C-sig2 and/or one or a plurality of other fields of the register bank may indicate at what time of the current cycle signal sig2 should be received and/or which signal sig2 should be received.

More generally, the order and/or the number of steps of the method of FIG. 2 may be modified. For example, step 210 and the steps 212 and 214 which are associated therewith may be provided after steps 204 and 208 and the steps 206 and 209 which are associated therewith. According to another example, steps 204 and 208 and the steps 206 and 209 which are associated therewith may be provided before transfer step 202. The order of the above-mentioned steps is, for example, determined by field C-sig1 and/or by one or a plurality of other fields of the register bank which indicate at what time of the current transfer cycle signal sig1 should possibly be generated, for example, before or after step 214 of update of the register bank. The order of the above-mentioned steps is, for example, determined by field C-sig2 and/or by one or a plurality of other fields of the register bank which indicate at what time of the current transfer cycle signal sig2 should possibly be received.

Although this has not been described hereabove, it may be provided for a current transfer cycle to be repeated. For example, the register bank may comprise a field indicating that the data transfer(s) of the current transfer cycle should be repeated. In this case, when a transfer cycle is repeated, step 214 may be omitted. According to another example, to repeat a transfer cycle, field C-@ of the register bank contains the memory address of the item corresponding to the last update of the register bank, that is, this item points on itself. In this case, the next updates of the register bank are performed from this item, as long as field C-@ is not modified to indicate an address other than that of this item.

Different implementation modes of the above method will now be described in further detail in relation with FIGS. 3, 4, 5, and 6.

Figure 3:
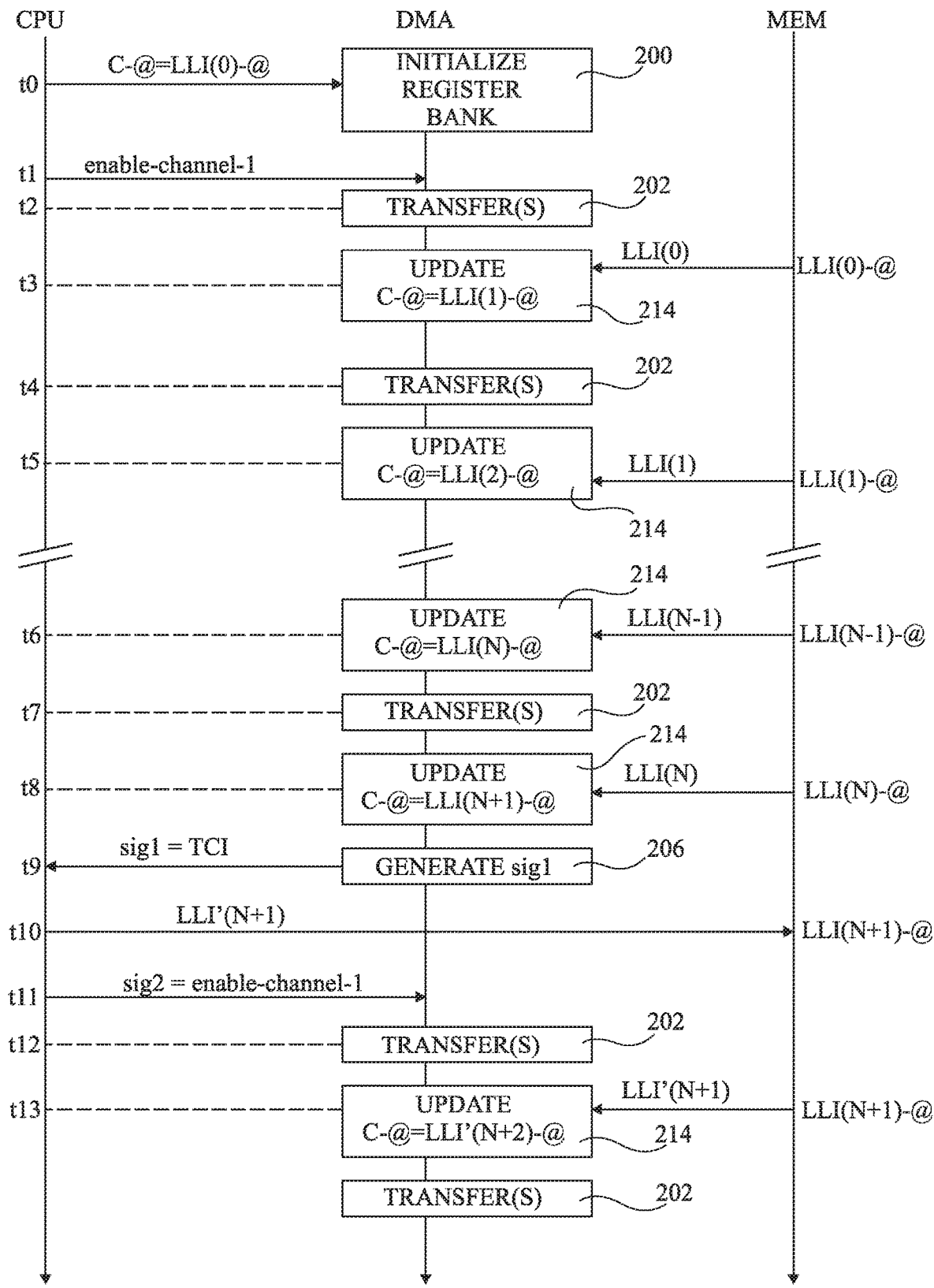
FIG. 3 illustrates an implementation mode of the method of FIG. 2.

FIG. 3 illustrates an example of a first implementation mode of the method of FIG. 2, in the present example by the system 1 of FIG. 1, and more particularly over a channel of circuit 14 (DMA) referred to as channel-1.

In the first implementation mode, to modify next transfer cycles, central processing unit 11 reads field C-@ to obtain the address of a next item of a linked list of items corresponding to the succession of transfer cycles being executed over a channel, after which central processing unit 11 programs (records), at this address, a new item, for example, the first item of a new linked list of items which is then also recorded into the memory.

In this example, signal sig1 is the same for all the transfer cycles where a signal sig1 is generated, signal sig1 being generated for central processing unit 11. Further, in this example, each time signal sig1 is generated, a same signal sig2 supplied by central processing unit 11 is expected by circuit 14. In the present example, the register bank does not comprise field C-sig2, step 208 being then performed simultaneously to step 204 and step 209 being carried out directly after step 206.

At a time t0, central processing unit 11 (CPU) initializes the register bank of the channel-1 channel (step 200). In particular, central processing unit 11 programs field C-@ of the register bank so that its content is representative of address LLI(0)-@ of memory 12 (MEM). Address LLI(0)-@ corresponds to the address, in memory 12, of a first item LLI(0) of a first linked list of items LLI recorded in memory 12.

At a next time t1, central processing unit 11 delivers a signal enable-channel-1 to circuit 14 which then activates the channel-1 channel.

Circuit 14 then performs, from a next time t2, the data transfer(s) parameterized by the current content of the register bank associated with the channel for channel-1 (step 202). The data transfer of the first transfer cycle of the application is, for example, a null transfer.

Circuit 14 then verifies, based on the content of the register bank, whether the current transfer cycle is the last one of the application (step 210 not illustrated in FIG. 3), for example after a reading of field C-@ of the register bank. In this example, the current transfer cycle is not the last transfer cycle of the application.

At a next time t3, circuit 14 then updates the register bank (step 214) based on item LLI(0) read from memory 12, at the address LLI(0)-@ indicated by field C-@. In the present example, after step 214, field C-@ of the register bank indicates address LLI(1)-@ in memory 12 of the next item LLI(1) of the first list LLI ("C-@=LLI(1)-@").

After step 214, circuit 14 reads field C-sig1 to determine whether it should generate signal sig1 (step 204, not illustrated in FIG. 3). As an example, it is here considered that the execution of the transfer cycles corresponding to the items of the first list LLI is performed uninterruptedly until the transfer cycle corresponding to item LLI(N) of the first list. In other words, in the present example, no signal sig1 is generated by circuit 14 and no signal sig 2 is expected by circuit 14 before the transfer cycle corresponding to item LLI(N) of list LLI.

Thus, at a next time t4, circuit 14 performs, over the channel-1 channel, the data transfer(s) (step 202) parameterized by the current content of the register bank, that is, here, by item LLI(0) of the first list LLI.

At a next time t5, after having determined that the current transfer cycle is not the last one of the application (step 210 not illustrated), circuit 14 updates the register bank of the channel-1 channel (step 214), based on the item LLI(1) read from memory 12, at the address LLI(1)-@ indicated by field C-@. After this update, field C-@ of the register bank indicates the address LLI(2)-@ of the next item LLI(2) in memory 12 ("C-@=LLI(2)-@").

A plurality of transfer cycles are thus successively implemented until a time t6.

At a next time t6, after having determined that the current transfer cycle is not the last one of the application (step 210 not illustrated), circuit 14 updates the register bank (step 214) associated with the channel-1 channel based on the item LLI(N−1) read at the address LLI(N−1)-@ indicated by field C-@. After step 214, field C-@ of the register bank of the channel-1 channel indicates the address LLI(N)-@ of the next item LLI(N) of the first list LLI ("C-@=LLI(N)-@").

From a next time t7, after having determined that no signal sig1 should be generated and that no signal sig2 should be received for the current transfer cycle (step 204 not illustrated), circuit 14 performs the data transfers (step 202) parameterized by the current content of the register bank, that is, by the item LLI(N−1) of the first list LLI in the present example.

At a next time t8, after having determined that the current transfer cycle is not the last one of the application (step 210 not illustrated), circuit 14 updates the register bank (step 214), based on the item LLI(N) recorded at the address LLI(N)-@ indicated by field C-@. After step 214, field C-@ of the register bank of the channel-1 channel indicates the address LLI(N+1)-@ of the next item LLI(N+1) of the first list LLI ("C-@=LLI(N+1)-@").

After step 214, circuit 14 determines, based on the current content of field C-sig1 of the register bank, whether it should generate signal sg1 for central processing unit 11 (step 204 not illustrated) before carrying on the execution of the transfer cycles over the channel. In the present example, signal sig1 should be generated by circuit 14, and the execution of the transfer cycles is suspended until the reception of signal sig2. In other words, circuit 14 determines, from field C-sig1, that the execution of the transfer cycles should be interrupted.

Thus, at a next time t9, circuit 14 generates a signal sig1 (step 206) for central processing unit 11. Preferably, signal sig1 corresponds to an interrupt signal TCI ("Transfer Complete Interrupt").

After having received signal sig1, central processing unit 11 determines, according to the state of system 1, whether the next transfer cycles to be implemented are those corresponding to the first list LLI or not. In the present example, it is considered that the next transfer cycles are not those determined by the first list LLI.

Thus, at a next time t10, central processing unit 11 records a new item LLI'(N+1) at the address LLI(N+1)-@ indicated by field C-@ of the register bank. As an example, the central processing unit recovers address LLI(N+1)-@ during a reading of field C-@ of the register bank. Preferably, central processing unit 11 records in memory 12 a second linked list of items LLI' having its first item corresponding to item LLI'(N+1), for example, a second list representative of the next transfer cycles to be implemented on the channel-1 channel.

At a next time t11, the central processing unit generates signal sig2, preferably the same signal enable-channel-1 as at time t1.

After having received signal sig2 (step 209 not illustrated), circuit 14 resumes the execution of the cycles of transfer over the channel-1 channel.

Thus, at a next time t12, the data transfer(s) parameterized by the current content of the register bank, that is, here, by the item LLI(N) of the first linked list of items, are performed by circuit 14 (step 202).

At a next time t13, after having determined that the current transfer cycle is not the last one of the application (step 210 not illustrated), circuit 14 updates the register bank associated with the channel-1 channel (step 214), based on the item LLI'(N+1) recorded in memory 12 at the address LLI(N+1)-@ indicated by field C-@. In the shown example, after this update, field C-@ of the register bank of the channel-1 channel indicates the address LLI'(N+2)-@ of the next item LLI'(N+2) of second list LLI' ("C-@=LLI'(N+2)-@").

As a result, next transfer cycles over the channel-1 channel are no longer determined by first list LLI, but by item LLI'(N+1) and, preferably, by second list LLI' having item LLI'(N+1) as a first item.

In this first embodiment, central processing unit 11 does not modify the content of the register bank associated with the channel-1 channel to modify the execution, over the channel-1 channel, of the transfer cycles of an application. Thus, it is not useful for circuit 14 to deactivate the channel-1 channel at step 206, and to reactive it upon reception of the corresponding signal sig2.

Although this has not been illustrated in FIG. 3, in the case where, after having received signal sig1 (time t9), central processing unit 11 determines, according to the state of system 1, whether the next transfer cycles to be implemented are those of first list LLI, central processing unit 11 then directly generates signal sig2, without modifying the content of memory 12.

Figure 4:
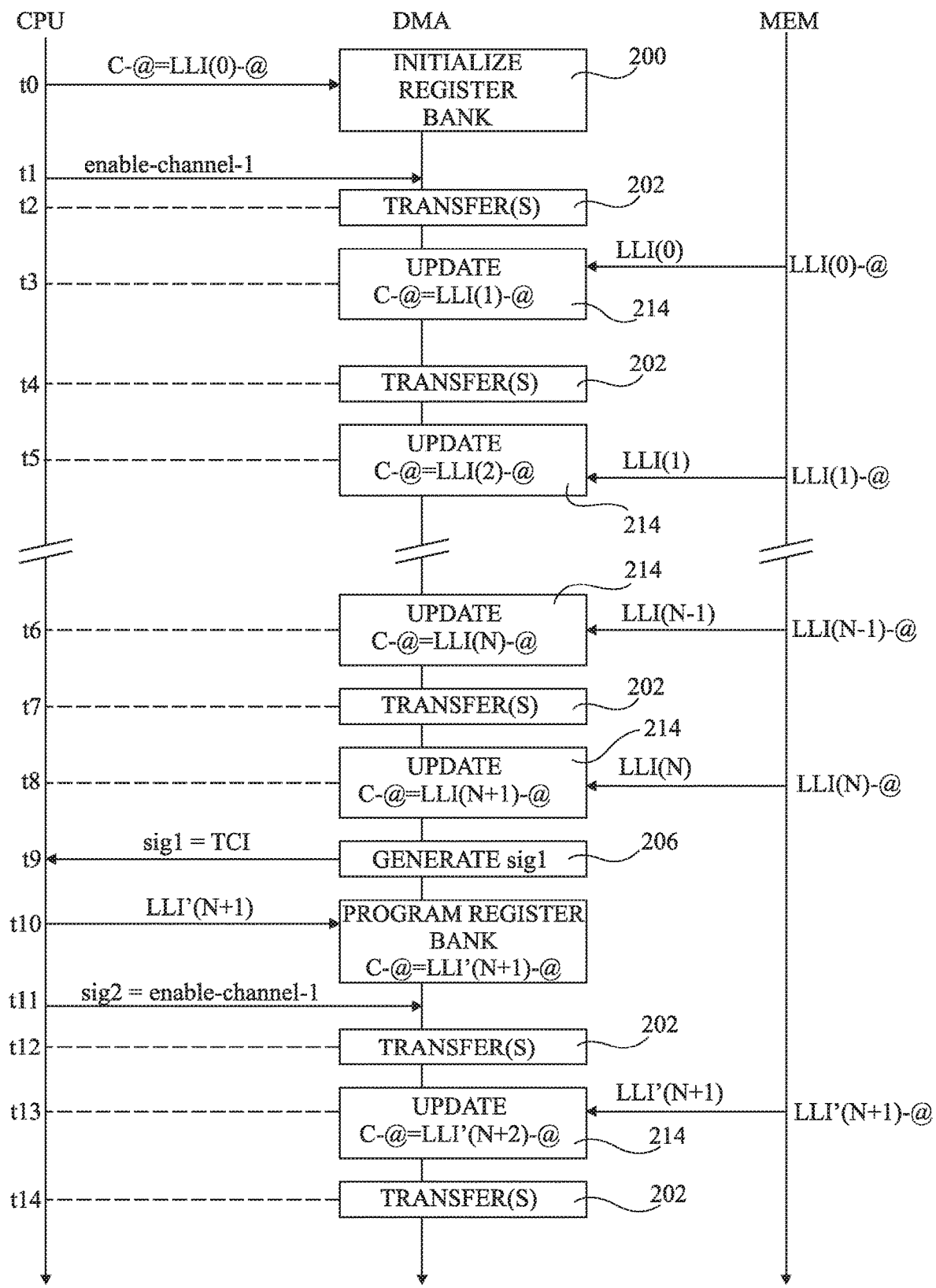
FIG. 4 illustrates another implementation mode of the method of FIG. 2.

FIG. 4 illustrates an example of a second embodiment of the method of FIG. 2, in the present example by system 1 of FIG. 1.

In this second implementation mode, to modify next transfer cycles corresponding to a first linked list of items recorded into a memory, central processing unit 11 directly programs the register bank from a new item. Preferably, the new item is the first item of a second list having its items, except for the first item, then recorded into the memory, preferably just before or just after the central processing unit has programmed the register bank with the first item of the second list.

In the present example, signal sig1 is the same for all the transfer cycles where it is generated, signal sig1 being generated for central processing unit 11. Further, in this example, each time signal sig1 is generated, a same signal sig2 supplied by central processing unit 11 is expected by circuit 14. In the present example, the register bank does not comprise field C-sig2, step 208 being then carried out simultaneously to step 204 and step 209 being carried out directly after step 206.

Only the differences between FIGS. 3 and 4 are here detailed.

As in FIG. 3, after time t8 and after having determined that signal sig1, here, interrupt signal TCI, should be generated by circuit 14 and that the execution of the transfer cycles should be suspended until reception of signal sig2, at time t9, circuit 14 generates signal sig1 (step 206). In this second implementation mode, circuit 14 further deactivates the channel-1 channel so that the central processing unit can program all or part of the content of the register bank.

After having received signal sig1, central processing unit 11 determines, according to the state of system 1, whether the next transfer cycles to be implemented are those corresponding to the first list LLI or not. In the present example, it is considered, as in FIG. 3, that the next transfer cycles are not those determined by the first list LLI.

Thus, at the next time t10, central processing unit 11 directly programs the content of the register bank based on an item LLI'(N) (block "PROGRAM REGISTER BANK"), without recording it into memory 12.

Preferably, item LLI'(N) is the first item of a second linked list of items LLI'. The next items of list LLI' are then recorded into the memory and field C-@ is programmed, by central processing unit 11 and from item LLI'(N), to indicate address LLI'(N+1)-@ of the next item LLI'(N+1) of list LLI' as shown in FIG. 4 ("C-@=LLI'+1)-@").

At the next time t11, central processing unit 11 generates signal sig2 (enable-channel-1). When it receives signal sig2, circuit 14 activates, or more exactly reactivates, the channel-1 channel.

At the next time t12, circuit 14 performs the data transfer(s) parameterized by the current content of the register bank (step 202), that is, here, by item LLI'(N) directly programmed in the register bank at time t10.

After this or these transfer(s), and after having determined that the current transfer cycle is not the last transfer cycle of the application (step 210 not illustrated), at time t13, the circuit updates the register bank (step 214), based on the item LLI'(N+1) recorded at the address LLI'(N+1)-@ indicated by field C-@ of the register bank. In the shown example, after this update, field C-@ of the register bank of the channel-1 channel indicates the address LLI'(N+2)-@ of the next item LLI'(N+2) of second list LLI' ("C-@=LLI'(N+2)-@").

At a next time t14, after having determined, in the present example, that no signal sig1 should be generated and that no signal sig2 should be received for the current transfer cycle (steps 204 and 208 not illustrated), circuit 14 performs the data transfer(s) (step 202) parameterized by the current content of the register bank, that is, by the item LLI'(N+1) of the second list LLI'.

Although this has not been illustrated in FIG. 4, in the case where, after having received signal sig1 (time t9), central processing unit 11 determines, according to the state of system 1, whether the next transfer cycles to be implemented are those of first list LLI, central processing unit 11 then directly generates signal sig2, without modifying the content of the register bank.

An advantage of the embodiment of FIG. 4 over that of FIG. 3 is that it enables to replace item LLI(N), corresponding to the transfer cycle where signal sig1 is generated, with an item LLI'(N), rather than an item LLI(N+1), corresponding to the transfer cycle following the transfer cycle where signal sig1 is generated, by an item LLI'(N+1).

Figure 5:
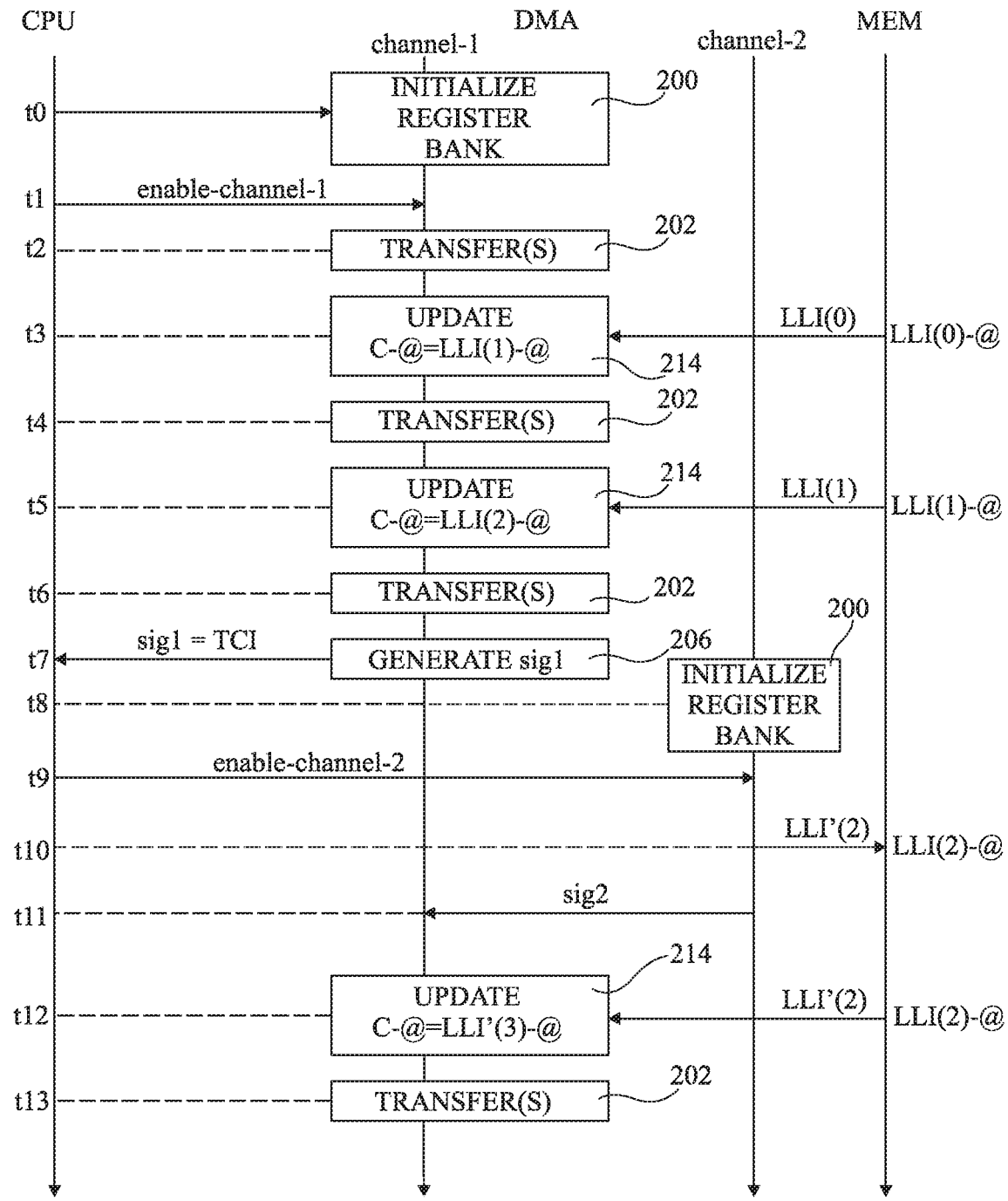
FIG. 5 illustrates another implementation mode of the method of FIG. 2.

FIG. 5 illustrates an example of a third mode of implementation of the method of FIG. 2, in the present example by system 1 of FIG. 1.

In the third implementation mode, field C-sig1 and possibly one or a plurality of other fields of the register bank associated with each channel indicate whether a signal sig1 should be generated during the current transfer cycle, which signal sig1 is generated, and at what time of the cycle signal sig1 should be generated. Further, in the third implementation mode, the register bank associated with each channel comprises field C-sig2 and possibly one or a plurality of other fields indicating whether a signal sig2 should or should not be received to carry on the execution of a corresponding transfer cycle, at what time of a transfer cycle signal sig2 is expected, and which is this signal sig2. Thus, it may be provided, at a given transfer cycle, for a signal sig1 to be sent to central processing unit 11 and for the execution of the transfer cycles to be interrupted until the reception, by circuit 14, of a corresponding signal sig2.

More particularly, in the third implementation mode, when central processing unit 11 receives a signal sig1 from a first channel, and when the next transfer cycles over the first channel should be modified, central processing unit 11 uses a second channel of circuit 14 to record into the memory a new item corresponding to a next transfer cycle over the first channel, and to generate signal sig2 once the transfer has ended over the second channel. Thus, in the third implementation mode, when next transfer cycles are modified, signal sig2 is not directly generated by central processing unit 11 but by circuit 14. However, central processing unit 11 triggers the generation of signal sig2 by programming the second channel in adapted fashion.

At a time t0, central processing unit 11 (CPU) programs the register bank of the channel-1 channel (step 200). In particular, central processing unit 11 programs field C-@ of the register bank so that its content is representative of address LLI(0)-@ of memory 12 (MEM). Address LLI(0)-@ corresponds to the address, in memory 12, of a first item LLI(0) of a first linked list of items LLI stored in memory 12.

At a next time t1, central processing unit 11 delivers a signal enable-channel-1 to circuit 14 (DMA), which then activates the channel-1 channel.

Circuit 14 then reads the content of the register bank of the channel-1 channel, in particular field C-sig1, to verify whether a signal sig1 should be generated (step 204, not illustrated) and if so (step 206, not illustrated), at what time of the current transfer cycle. Based on the reading of the content of the register bank, circuit 14 also verifies, in particular based on the reading of field C-sig2, whether a signal sig2 should be received (step 208, not illustrated) and, if so (step 209, not illustrated), at what time of the transfer cycle. Signals sig1 and sig2 may thus be used to synchronize times of execution of a succession of cycles of transfer over the channel-1 channel with other events taking place in the system, particularly transfer cycles performed over another channel of circuit 14.

As an example, it is here considered that for the current transfer cycle, no signal sig1 should be generated and no signal sig2 is expected to carry on the execution of the transfer cycles over the channel-1 channel.

Circuit 14 then performs, from a next time t2, the data transfer(s) (step 202) parameterized by the current content of the register bank associated with the channel-1 channel. As an example during the first transfer cycle of the application, the data transfer is a null transfer.

Circuit 14 then determines whether the current transfer cycle is the last transfer cycle of the application or not (step 210 not illustrated).

In this example, the current transfer cycle is not the last transfer cycle of the application. Thus, at a next time t3, circuit 14 updates the register bank (step 214) based on item LLI(0) read from memory 12, at the address LLI(0)-@ indicated by field C-@. In this example, after step 214, field C-@ of the register bank indicates address LLI(1)-@ in memory 12 of the next item LLI(1) of the first list ("C-@=LLI(1)-@").

Circuit 14 then reads the content of the register bank of the channel-1 channel to verify whether a signal sig1 should be generated (step 204, not illustrated) and if so (step 206, not illustrated), at what time of the current transfer cycle, and to verify whether a signal sig2 should be received (step 208, not illustrated) and, if so (step 209, not illustrated), at what time of the transfer cycle.

As an example, it is here considered that for the current transfer cycle, no signal sig1 should be generated and no signal sig2 is expected to carry on the execution of the transfer cycles over the channel-1 channel.

Circuit 14 then performs, from a next time t4, the data transfer(s) (step 202) parameterized by the current content of the register bank associated with the channel-1 channel, that is, here, by item LLI(0) of the first list LLI.

Circuit 14 then determines whether the current transfer cycle is the last transfer cycle of the application or not (step 210 not illustrated). In this example, the current transfer cycle is not the last transfer cycle of the application and, at a next time t5, circuit 14 updates the register bank (step 214), based on the item LLI(1) read from memory 12, at the address LLI(1)-@ indicated by field C-@. In this example, after step 214, field C-@ of the register bank indicates address LLI(2)-@ in memory 12 of the next item LLI(2) of the first list LLI ("C-@=LLI(2)-@").

Circuit 14 then reads the content of the register bank of the channel-1 channel to verify whether a signal sig1 should be generated (step 204, not illustrated) and if so (step 206, not illustrated), at what time of the current transfer cycle, and to verify whether a signal sig2 should be received (step 208, not illustrated) and, if so (step 209, not illustrated), at what time of the transfer cycle. As an example, it is here considered that for the current transfer cycle, a signal sig1 should be generated for central processing unit 11, at the end of transfer step 202, and that a signal sig2 should be received, before step 210, to carry on the execution of the transfer cycles over the channel-1 channel.

Thus, at a next time t6, circuit 14 performs, over the channel-1 channel, the data transfer(s) (step 202) parameterized by the current content of the register bank, that is, in the present example, by item LLI(0) of the first list LLI.

At a next time t7, circuit 14 generates signal sig1 for central processing unit 11 (step 206), in the present example signal TCI. Then, circuit 14 waits to receive signal sig2 before implementing step 210. In other words, the execution of the transfer cycles over the channel-1 channel is suspended until the reception of signal sig2. Preferably, on generation of signal sig1, circuit 14 does not deactivate the channel-1 channel.

When central processing unit 11 receives signal sig1, it determines, according to the state of system 1, whether the next transfer cycles over the channel-1 channel are those corresponding to the first list LLI or whether other transfer cycles than those of list LLI should be implemented. The case where other transfer cycles than those of first list LLI should be implemented is here considered as an example.

At a next time t8, central processing unit 11 initializes another channel, here the channel-2 channel, of circuit 14, that is, programs the register bank associated with the channel-2 channel (step 200 for the channel-2 channel). More particularly, central processing unit 11 programs the register bank so that the channel-2 channel implements a transfer, to memory 12, at address LLI(2)-@, of an item LLI'(2). Address LLI(2)-@ is for example obtained by the central processing unit upon reading of field C-@ of the register bank associated with the channel-1 channel. Further, preferably, item LLI'(2) is the first item of a linked list of items LLI'. In this case, the other items of list LLI' are preferably recorded in memory 12 at the same time as item LLI'(2).

Further, central processing unit 11 programs field C-sig1 and possibly one or a plurality of other fields of the register bank associated with the channel-2 channel so that, once the transfer of item LLI'(2) to memory 12 has ended, circuit 14 generates a signal sig1 associated with the channel-2 channel. More particularly, the signal sig1 associated with the channel-2 channel here is the signal sig2 expected by the channel-1 channel, central processing unit 11 having been informed of the signal sig2 expected by the channel-1 channel, for example, on reading of the register bank associated with the channel-1 channel.

At a next time t9, the central processing unit delivers a signal enable-channel-2 to circuit 14, which then activates the channel-2 channel.

Circuit 14 then reads the content of the register bank associated with the channel-2 channel and is informed that a signal sig1 is to be generated for the current cycle of transfer over the channel-2 channel, that this signal sig1 is the signal sig2 of the channel-1 channel, and that this signal sig1 should be generated once item LLI'(2) has been transferred into the memory via the channel-2 channel.

Thus, at a next time t10, circuit 14 transfers item LLI'(2) into the memory, at address LLI(2)-@.

At a next time t11, circuit 14 generates the signal sig1 associated with the channel-2 channel, that is, the signal sig2 expected by the channel-1 channel.

At a next time t12, after signal sig2 has been received by circuit 14 and after having determined that the current transfer cycle of the channel-1 channel is not the last one of the application (step 210 not illustrated), circuit 14 updates the register bank associated with the channel-1 channel (step 214). More particularly, circuit 14 updates the register bank from the item LLI'(2) read from memory 12, at the address LLI(2)-@ indicated by field C-@ of the register bank. After the update, in the present example, field C-@ indicates the address LLI'(3)-@, in memory 12, of a next item of list LLI' having item LLI'(2) as its first item ("C-@=LLI'(3)-@").

Circuit 14 then reads the content of the register bank of the channel-1 channel to verify whether a signal sig1 should be generated (step 204, not illustrated) and, if so (step 206, not illustrated), at what time of the current transfer cycle, and to verify whether a signal sig2 should be received (step 208, not illustrated) and, if so (step 209, not illustrated), at what time of the transfer cycle. As an example, it is here considered that for the current transfer cycle, no signal sig1 should be generated and no signal sig2 is expected to carry on the execution of the cycles of transfer over the channel-1 channel.

At a next time t13, circuit 14 performs, over the channel-1 channel, the data transfer(s) (step 202) parameterized by the current content of the register bank associated with the channel-1 channel, that is, here, by item LLI'(2).

In the third implementation mode, central processing unit 11 does not modify the content of the register bank associated with the channel-1 channel to modify the execution, over the channel-1 channel, of the transfer cycles of an application. Thus, the channel-1 channel remains active and allocated all along the execution of the application.

Further, as compared with the first and second embodiments, in the third implementation mode, fields C-sig1 and C-sig2 may also be used to synchronize the execution of transfer cycles over a channel with events taking place in system 1, in addition to the their use to modify, at at least one transfer cycle, according to the state of system 1, the succession of transfer cycles being executed over a channel.

Further, in the third embodiment, central processing unit 11 does not have to access the memory to insert an item LLI'(N) replacing an item LLI(N) for programming the channel-1 channel, the memory access being performed by auxiliary the channel-2 channel. In other words, central processing unit 11 does not have to manage memory accesses and the time constraints which may be associated with such a memory access. It is however made sure, due to the signal sig2 emitted by auxiliary the channel-2 channel, that the execution of the application having the channel-1 channel allocated thereto can only be resumed once the channel-2 channel has written into the memory the linked list item conditioning the next transfer of the application.

Although this has not been illustrated in FIG. 5, in the case where, after having received signal sig1 (time t7), central processing unit 11 determines, according to the state of system 1, whether the next transfer cycles to be implemented are those of first list LLI, the central processing unit initializes the channel-2 channel so that the transfer performed at time t10 is a null transfer but that the signal sig2 expected by the channel-1 channel is still generated by the channel-2 channel at the end of the null transfer. In this case, item LLI(2) of list LLI, recorded at address LLI(2)-@ is not replaced with an item LLI'(2).

Although this has not been described in relation with FIGS. 2, 3, and 4, when all or part of the content of a register bank is updated based on an item of a linked list of items, the item comprises information representative of the update of all or part of the fields of the register bank, particularly fields C-param determining the date transfer(s) of the next transfer cycle.

Various embodiments and variations have been described. It will be understood by those skilled in the art that certain features of these various embodiments and variations may be combined, and other variations will occur to those skilled in the art. In particular, first and second implementation modes where the content of field C-sig1 may be different between two transfer cycles of a succession of transfer cycles performed over a channel, that is, for each cycle, the execution may or not be suspended according to the content of field C-sig1, have been described. It may be provided for the content of field C-sig1 to be identical for all the transfer cycles of an application, for example, if field C-sig1 belongs to a static register of a corresponding configuration and the content of the state register cannot be modified in an update of the register bank from the memory. In such a variation, according to field C-sig1, the execution of the transfer cycles of the application is for example interrupted for each transfer cycle, or is for example never interrupted.

Further, the first and second implementation modes may apply to a circuit 14 comprising a single channel.

Finally, the practical implementation of the described embodiments and variations is within the abilities of those skilled in the art based on the functional indications given hereabove. In particular, it will be within the abilities of those skilled in the art to determine the data structure of each item of a linked list of items, and/or the number and the size of the registers of a configuration register bank based on the functional indications given hereabove. Further, it will be within the abilities of those skilled in the art to implement the described embodiments in other systems than system 1 of FIG. 1.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method implemented by a system, comprising a direct memory access circuit, a central processing unit, and a memory, the method comprising:
   a) initializing a register bank of a data transfer channel of the direct memory access circuit;
   b) executing transfer cycles over said data transfer channel, each of said transfer cycles comprising at least one data transfer configured by a content of the register bank, and updating the content of the register bank from said memory;
   c) generating a first signal and suspending the execution of the transfer cycles over said data transfer channel in response to a signal generation indicator in at least one first field of the register bank;
   d) in response to reception of the first signal by the central processing unit, further operating while execution of transfer cycles is suspended by: performing at least one of modifying the content of the register bank and recording into the memory a first item representative of a next update of the register bank, and then generating a second signal; and
   e) in response to reception of the second signal by the direct memory access circuit, carrying on the execution of said transfer cycles over said data transfer channel.

2. The method of claim 1, wherein step a) comprises programming the register bank by the central processing unit.

3. The method of claim 1, wherein step d) further comprises reading by the central processing unit of a second field of the register bank having third content that identifies a first address in the memory at which a second item representative of a next update of the register bank is recorded.

4. The method of claim 3, wherein step d) further comprises not modifying the content of the register bank by the central processing unit and recording the first item at said first address.

5. The method of claim 3, wherein generating the second signal is performed by the central processing unit.

6. The method of claim 1, wherein step d) further comprises programming the content of the register bank by the central processing unit.

7. The method of claim 6, wherein programming the content of the register bank is performed based on the first item, without recording the first item into said memory.

8. The method of claim 6, further comprising deactivating said data transfer channel by the direct memory access circuit at step c), and activating said data transfer channel in response to receipt of the second signal generated at step d).

9. The method of claim 6, wherein generating the second signal is performed by the central processing unit.

10. The method of claim 1, wherein step d) further comprises programming by the central processing unit of another data transfer channel of the direct memory access circuit so that said another data transfer channel records into the memory said first item and generating the second signal after the recording of said first item into the memory.

11. The method of claim 10, wherein step d) further comprises reading by the central processing unit of a second field of the register bank, said second field indicating a first address in the memory at which a second item representative of a next update of the register bank is recorded.

12. The method of claim 11, wherein step d) further comprises programming by the central processing unit the another data transfer channel so that said first item is recorded at said first address.

13. The method of claim 1, wherein the first signal is generated by the direct memory access circuit.

14. The method of claim 1, wherein the first item is the initial item of a linked list of items and each item of said list following the initial item is recorded into the memory at step d).

15. An electronic system, comprising:
   a memory,
   a central processing unit, and
   a direct memory access circuit comprising at least one data transfer channel, wherein each data transfer channel includes a register bank,
   wherein the central processing unit is configured to:
      a) initialize the register bank of the at least one data transfer channel;
      b) execute transfer cycles over said data transfer channel, each of said transfer cycles comprising at least one data transfer configured by a content of the register bank, and update the content of the register bank from said memory;
      c) generate a first signal and suspend the execution of the transfer cycles over said data transfer channel in response to a signal generation indicator in at least one first field of the register bank;
      d) in response to reception of the first signal by the central processing unit, further operating while execution of transfer cycles is suspended by: performing at least one of modifying the content of the register bank and recording into the memory a first item representative of a next update of the register bank, and then generating a second signal; and wherein the direct memory access circuit is configured to respond to reception of the second signal by carrying on execution of said transfer cycles over said data transfer channel.

16. The electronic system of claim 15, wherein the central processing unit modifies the content by reading a second field of the register bank with third content that identifies a first address in the memory at which a second item representative of a next update of the register bank is recorded.

17. The electronic system of claim 16, wherein central processing unit further does not modify the content of the register bank records the first item at said first address.

18. The electronic system of claim 15, wherein the central processing unit modifies the content by programming the content of the register bank.

19. The electronic system of claim 18, wherein the programming of the content of the register bank is performed based on the first item, without recording the first item into said memory.

20. The electronic system of claim 18, wherein the direct memory access circuit is configured to deactivate said data transfer channel in response to the first signal and further activates said data transfer channel in response to the second signal.

21. The electronic system of claim 15, wherein the central processing unit further programs another data transfer channel of the direct memory access circuit so that said another data transfer channel records into the memory said first item and generate the second signal after the recording of said first item into the memory.

22. The electronic system of claim 21, wherein the central processing unit further reads a second field of the register bank, said second field indicating a first address in the memory at which a second item representative of a next update of the register bank is recorded.

23. The electronic system of claim 22, wherein the central processing unit further programs the another data transfer channel so that said first item is recorded at said first address.

24. The electronic system of claim 15, wherein the first signal is instead generated by the direct memory access circuit.

25. The electronic system of claim 15, wherein the first item is the initial item of a linked list of items and each item of said list following the initial item is recorded into the memory.

* * * * *